United States Patent
Liang et al.

(10) Patent No.: US 9,809,214 B2
(45) Date of Patent: Nov. 7, 2017

(54) BATTERY STATE OF CHARGE CONTROL USING ROUTE PREVIEW DATA

(71) Applicant: Ford Global Technologies, LLC, Dearborn, MI (US)

(72) Inventors: Wei Liang, Farmington Hills, MI (US); Yanan Zhao, Ann Arbor, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 14/705,314

(22) Filed: May 6, 2015

(65) Prior Publication Data

US 2016/0325726 A1    Nov. 10, 2016

(51) Int. Cl.
| | |
|---|---|
| *B60W 10/06* | (2006.01) |
| *B60K 6/48* | (2007.10) |
| *B60W 10/08* | (2006.01) |
| *B60W 20/12* | (2016.01) |

(52) U.S. Cl.
CPC ............... *B60W 20/12* (2016.01); *B60K 6/48* (2013.01); *B60W 10/06* (2013.01); *B60W 10/08* (2013.01); *B60W 2510/244* (2013.01); *B60W 2550/402* (2013.01); *Y02T 10/6221* (2013.01); *Y02T 10/6269* (2013.01); *Y02T 10/6286* (2013.01); *Y10S 903/93* (2013.01)

(58) Field of Classification Search
CPC ...... B60W 20/12; B60W 10/06; B60W 10/26; B60W 20/13; B60W 2710/06; B60W 2510/244; B60W 2710/244; B60W 2250/14; Y10S 903/93
See application file for complete search history.

(56) References Cited

U.S. PATENT DOCUMENTS

| | | | |
|---|---|---|---|
| 8,515,607 B2 | 8/2013 | Amano et al. | |
| 8,825,243 B2 | 9/2014 | Yang et al. | |
| 8,903,578 B2 | 12/2014 | Yamazaki et al. | |
| 2005/0189894 A1* | 9/2005 | Komiyama | B60K 6/46 318/376 |
| 2007/0038355 A1* | 2/2007 | Brandt | E02F 3/3414 701/50 |
| 2011/0066308 A1* | 3/2011 | Yang | B60W 20/12 701/22 |

(Continued)

*Primary Examiner* — Rodney Butler
(74) *Attorney, Agent, or Firm* — David Kelley; Brooks Kushman P.C.

(57) ABSTRACT

A vehicle includes an engine and at least one controller. A first engine cycling command based on route information and a second engine cycling command independent of route information are generated. The engine transitions state according to the first engine cycling command when the second engine cycling command permits the transition. When a first engine cycling profile based on route information includes at least a number of engine cycles, the engine is cycled according to the first engine cycling profile, otherwise, the engine is cycled according to an engine cycling state derived independent of route information. The vehicle includes a traction battery. A state of charge of the traction battery is controlled according to a target state of charge that is derived using route information and a base battery power reference that is independent of route information.

18 Claims, 3 Drawing Sheets

(56) References Cited

U.S. PATENT DOCUMENTS

| | | | |
|---|---|---|---|
| 2011/0066359 A1* | 3/2011 | Lin | F02N 11/0833 |
| | | | 701/112 |
| 2011/0088658 A1* | 4/2011 | Chan | B60K 6/485 |
| | | | 123/339.16 |
| 2013/0024055 A1 | 1/2013 | Hysko, Jr. et al. | |
| 2013/0158838 A1* | 6/2013 | Yorke | B60W 10/06 |
| | | | 701/103 |
| 2014/0257608 A1 | 9/2014 | Dufford | |
| 2014/0310206 A1* | 10/2014 | Budiscak | F02D 41/2438 |
| | | | 706/11 |
| 2015/0039169 A1* | 2/2015 | Dextreit | B60W 50/0097 |
| | | | 701/22 |
| 2016/0023649 A1* | 1/2016 | Muller | B60W 20/106 |
| | | | 701/22 |
| 2016/0167640 A1* | 6/2016 | Zettel | B60W 10/08 |
| | | | 701/22 |

* cited by examiner

BATTERY STATE OF CHARGE CONTROL USING ROUTE PREVIEW DATA

TECHNICAL FIELD

This application is generally related to managing battery state of charge using route information.

BACKGROUND

Hybrid-electric vehicles include an engine and a traction battery to provide power to operate the vehicle. Propulsion is provided by the engine and electric machines coupled to the wheels through a transmission. An energy management system may operate the engine and electric machines in various operating modes to improve fuel economy. Government regulations generally require that fuel economy labels be placed on vehicles at the time of sale. The fuel economy values placed on the labels are determined based on government directed test procedures.

SUMMARY

A vehicle includes an engine and at least one controller programmed to generate a first engine cycling command based on route information and a second engine cycling command independent of route information. The at least one controller is further programmed to, in response to the first engine cycling command being an engine off request and the second engine cycling command being permissive of engine off requests while the engine is on, command the engine to transition to off.

The second engine cycling command may be permissive of the engine off request when the second engine cycling command does not request the engine to be on. The second engine cycling command may be permissive of the engine off request by the first engine cycling command when the second engine cycling command does not inhibit the engine off request. The second engine cycling command may be permissive of the engine off request by the first engine cycling command when the second engine cycling command does not request an engine state having greater priority than the first engine cycling command.

The at least one controller may be further programmed to, in response to the first engine cycling command being an engine on request and the second engine cycling command being permissive of engine on requests while the engine is off, command the engine to transition to on. The second engine cycling command may be permissive of the engine on request by the first engine cycling command when the second engine cycling command does not request an engine state having greater priority than the first engine cycling command.

The vehicle may further include a traction battery. The at least one controller may be further programmed to generate a target state of charge for the traction battery based on the route information and a base battery power reference independent of the route information. The at least one controller may be further programmed to, in response to the first engine cycling command defining at least a predetermined number of engine cycles over the route, charge and discharge the traction battery based on the target state of charge and the base battery power reference. The target state of charge for the traction battery may be within a first predetermined state of charge range. The base battery power reference may be a power level selected to control a state of charge of the traction battery within a second predetermined state of charge range that includes the first predetermined state of charge range.

The at least one controller may be further programmed to charge and discharge the traction battery according to a battery power reference derived as a sum of the base battery power reference and a control strategy output based on a difference between the target state of charge and a state of charge of the traction battery. The at least one controller may be further programmed to, in response to the first engine cycling command defining less than the predetermined number of engine cycles over the route, charge and discharge the traction battery according to the base battery power reference. The base battery power reference may be based on a present driver power demand, a state of charge of the traction battery and battery maintenance state of charge limits.

The at least one controller may be further programmed to, in response to the first engine cycling command defining less than a predetermined number of predicted engine cycles over a route, command the engine according to the second engine cycling command. The route information may include a predicted vehicle speed profile and a predicted road grade profile. The first engine cycling command may define less than a predetermined number of engine cycles when one or more of a predicted vehicle speed profile is greater than a predetermined speed over a route and a predicted driver power demand profile is greater than a predetermined power over the route.

A vehicle includes an engine and at least one controller programmed to, in response to an engine cycling profile derived from a predicted driver power demand that is based on route information having a number of engine cycles greater than a predetermined number, cycle the engine according to the engine cycling profile, and otherwise, cycle the engine according an engine cycling state derived from a present driver power demand that is independent of the route information.

The at least one controller may be further programmed to command the engine according to the engine cycling state when the engine cycling state inhibits a transition requested by the engine cycling profile. The at least one controller may be further programmed to command the engine according to the engine cycling state when the engine cycling state requests an engine state having greater priority than the engine cycling profile.

The at least one controller may be further programmed to, in response to the engine cycling profile having the number of engine cycles greater than the predetermined number, charge or discharge a traction battery according to a target state of charge profile derived from the predicted driver power demand profile, and otherwise, charge or discharge the traction battery according to a target state of charge level derived from the present driver power demand. The at least one controller may be further programmed to output an engine power request that is based on a difference between the target state of charge profile and a present state of charge of the traction battery.

A method includes outputting, by a controller, an engine off command, in response to a first engine cycling command that is based on route information including an engine off request and a second engine cycling command that is independent of route information being permissive of the engine off request while an engine is on. The method further includes operating the engine according to the engine off command.

The method may further include outputting, by the controller, an engine on command in response to the first engine cycling command including an engine on request and the second engine cycling command being permissive of the engine on request while the engine is off, and operating the engine according to the engine on command The method may further include outputting, by the controller, a first target state of charge for a traction battery based on the route information and a battery power reference independent of the route information, and charging and discharging the traction battery according to the first target state of charge in response to the first engine cycling command defining at least a predetermined number of engine cycles over the route.

The method may further include operating the engine according to the second engine cycling command in response to the second engine cycling command being non-permissive of the engine off request.

The method may further include operating the engine according to the second engine cycling command in response to the first engine cycling command defining less than a predetermined number of predicted engine cycles over a route.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
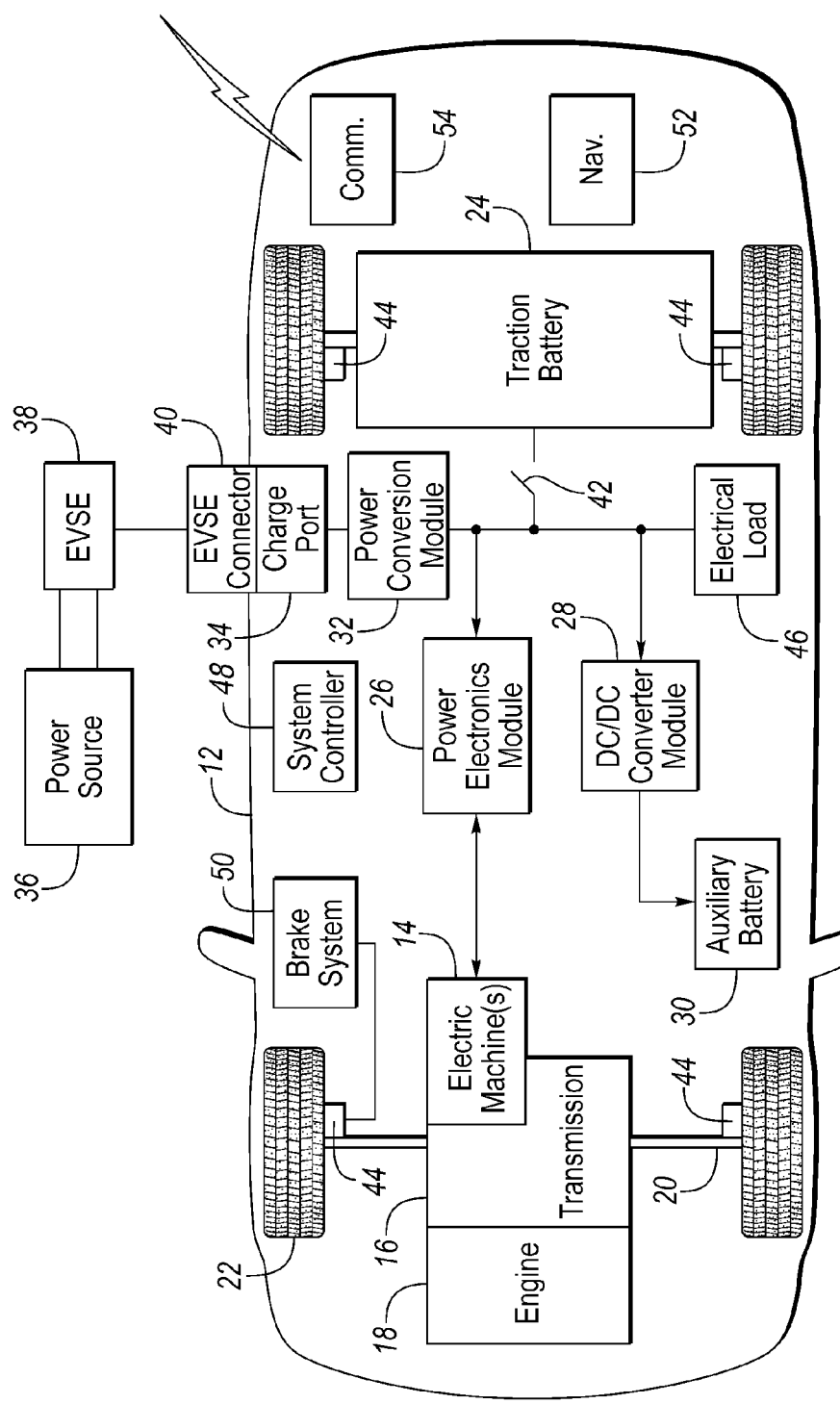
FIG. 1 is a diagram of a hybrid vehicle illustrating typical drivetrain and energy storage components.

FIG. 1 depicts a typical plug-in hybrid-electric vehicle (PHEV). A typical plug-in hybrid-electric vehicle 12 may comprise one or more electric machines 14 mechanically coupled to a hybrid transmission 16. The electric machines 14 may be capable of operating as a motor or a generator. In addition, the hybrid transmission 16 is mechanically coupled to an engine 18. The hybrid transmission 16 is also mechanically coupled to a drive shaft 20 that is mechanically coupled to the wheels 22. The electric machines 14 can provide propulsion and deceleration capability when the engine 18 is turned on or off. The electric machines 14 also act as generators and can provide fuel economy benefits by recovering energy that would normally be lost as heat in a friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high voltage DC output. The traction battery 24 is electrically coupled to one or more power electronics modules. One or more contactors 42 may isolate the traction battery 24 from other components when opened and connect the traction battery 24 to other components when closed. The power electronics module 26 is also electrically coupled to the electric machines 14 and provides the ability to bi-directionally transfer energy between the traction battery 24 and the electric machines 14. For example, a traction battery 24 may provide a DC voltage while the electric machines 14 may operate with a three-phase AC current to function. The power electronics module 26 may convert the DC voltage to a three-phase AC current to operate the electric machines 14. In a regenerative mode, the power electronics module 26 may convert the three-phase AC current from the electric machines 14 acting as generators to the DC voltage compatible with the traction battery 24.

In addition to providing energy for propulsion, the traction battery 24 may provide energy for other vehicle electrical systems. A vehicle 12 may include a DC/DC converter module 28 that converts the high voltage DC output of the traction battery 24 to a low voltage DC supply that is compatible with low-voltage vehicle loads. An output of the DC/DC converter module 28 may be electrically coupled to an auxiliary battery 30 (e.g., 12V battery). The low-voltage systems may be electrically coupled to the auxiliary battery. Other high-voltage loads 46, such as compressors and electric heaters, may be coupled to the high-voltage output of the traction battery 24.

The vehicle 12 may be a plug-in hybrid vehicle in which the traction battery 24 may be recharged by an external power source 36. The external power source 36 may be a connection to an electrical outlet. The external power source 36 may be electrically coupled to a charger or electric vehicle supply equipment (EVSE) 38. The external power source 36 may be an electrical power distribution network or grid as provided by an electric utility company. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically coupled to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically coupled or connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 may be coupled to the high-voltage bus. The electrical loads 46 may have an associated controller that operates and controls the electrical loads 46 when appropriate. Examples of electrical loads 46 may be a heating module or an air-conditioning module.

Electronic modules in the vehicle 12 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 30. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 12. A vehicle system controller (VSC) 48 may be present to coordinate the operation of the various components.

Figure 2:
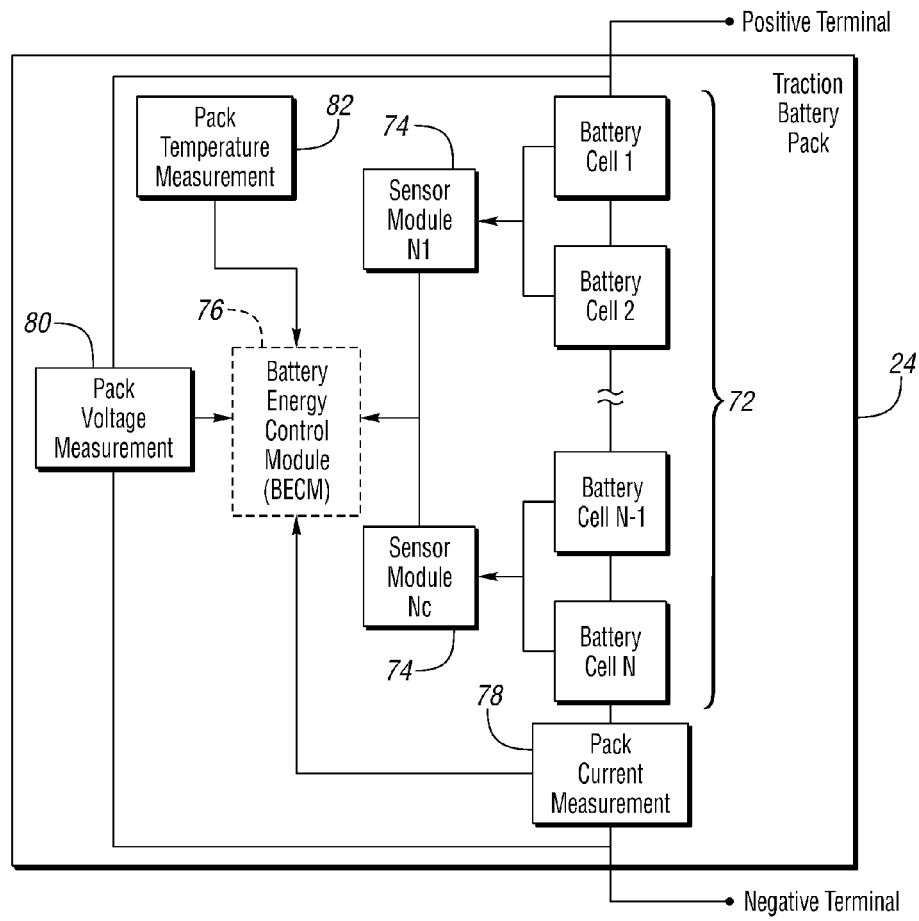
FIG. 2 is a diagram of a possible battery pack arrangement comprised of multiple cells, and monitored and controlled by a Battery Energy Control Module.

A traction battery 24 may be constructed from a variety of chemical formulations. Typical battery pack chemistries may be lead acid, nickel-metal hydride (NIMH) or Lithium-Ion. FIG. 2 shows a typical traction battery pack 24 in a simple series configuration of N battery cells 72. Other battery packs 24, however, may be composed of any number of individual battery cells connected in series or parallel or some combination thereof. A battery management system may have a one or more controllers, such as a Battery Energy Control Module (BECM) 76, that monitor and control the performance of the traction battery 24. The battery pack 24 may include sensors to measure various pack level characteristics. The battery pack 24 may include one or more pack current measurement sensors 78, pack voltage measurement sensors 80, and pack temperature measurement sensors 82. The BECM 76 may include circuitry to interface with the pack current sensors 78, the pack voltage sensors 80 and the pack temperature sensors 82. The BECM 76 may have non-volatile memory such that data may be retained when the BECM 76 is in an off condition. Retained data may be available upon the next key cycle.

In addition to the pack level characteristics, there may be battery cell 72 level characteristics that are measured and monitored. For example, the terminal voltage, current, and temperature of each cell 72 may be measured. A system may use a sensor module 74 to measure the battery cell 72 characteristics. Depending on the capabilities, the sensor module 74 may measure the characteristics of one or multiple of the battery cells 72. The battery pack 24 may utilize up to N, sensor modules 74 to measure the characteristics of all the battery cells 72. Each sensor module 74 may transfer the measurements to the BECM 76 for further processing and coordination. The sensor module 74 may transfer signals in analog or digital form to the BECM 76. In some configurations, the sensor module 74 functionality may be incorporated internally to the BECM 76. That is, the sensor module 74 hardware may be integrated as part of the circuitry in the BECM 76 and the BECM 76 may handle the processing of raw signals. The BECM 76 may also include circuitry to interface with the one or more contactors 42 to open and close the contactors 42.

It may be useful to calculate various characteristics of the battery pack. Quantities such a battery power capability and battery state of charge may be useful for controlling the operation of the battery pack as well as any electrical loads receiving power from the battery pack. Battery power capability is a measure of the maximum amount of power the battery can provide or the maximum amount of power that the battery can receive. Knowing the battery power capability allows the electrical loads to be managed such that the power requested is within limits that the battery can handle.

Battery pack state of charge (SOC) gives an indication of how much charge remains in the battery pack. The SOC may be expressed as a percentage of the total charge remaining in the battery pack. The battery pack SOC may be output to inform the driver of how much charge remains in the battery pack, similar to a fuel gauge. The battery pack SOC may also be used to control the operation of an electric or hybrid-electric vehicle. Calculation of battery pack SOC can be accomplished by a variety of methods. One possible method of calculating battery SOC is to perform an integration of the battery pack current over time. This is well-known in the art as ampere-hour integration.

An energy management system (EMS) may operate the powertrain of the vehicle to minimize fuel consumption. The EMS may be implemented as part of one or more controllers in the vehicle 12. The powertrain may include the engine, the transmission, the electric machines and associated power electronics module, and the traction battery. The EMS may determine an operating state for the engine and the electric machines to minimize the fuel consumption of the engine. The functions of the EMS may be incorporated into one or more controllers such as the VSC 48.

The vehicle 12 may include a navigation module 52 that provides routing information to the operator. The navigation module 52 may include a vehicle position sensor compatible with the Global Positioning System (GPS). The navigation module 52 may include a display for displaying map and route information. The display may be a touchscreen that is used for input to the navigation module 52. The operator may input a destination or select a destination from memory. The navigation module 52 may output the vehicle position to other modules. The navigation module 52 may also output route information to other modules.

The vehicle 12 may include a wireless communications module 54 to communicate with devices and systems remote from the vehicle 12. The wireless communications module 54 may include an onboard modem having an antenna to communicate with off-board devices or systems. The wireless communications module 54 may be a cellular communications device to enable communications via a cellular data network. The wireless communications module 54 may be a wireless local area network (LAN) device compatible with IEEE 802.11 family of standards (i.e., WiFi) or a WiMax network. The wireless communications module 54 may include a vehicle based wireless router to allow connection to remote networks in range of a local router. The wireless communications module 54 may interface with one or more controllers in the vehicle 12 to provide data. For example, the data may include traffic and construction data, routing instructions, and weather data. The data received via the wireless communications module 54 may be utilized by the navigation module 52 in determining a route for the vehicle 12.

Figure 3:
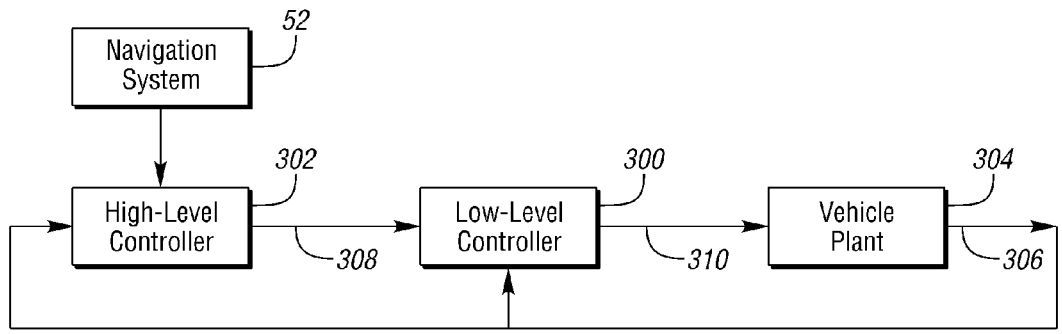
FIG. 3 is a possible controller architecture for an energy management system.

FIG. 3 depicts a possible controller architecture for implementing the EMS. In some configurations, the EMS may include a low-level controller 300 and a high-level controller 302. The high-level controller 302 may incorporate high-level energy management planning (EMP) strategies. The low-level controller 300 may implement instructions for coordinating the powertrain components. The low-level controller 300 may output various operational signals 310 to control the operation of powertrain and vehicle components. The powertrain and vehicle components are represented as a vehicle model or plant 304. The vehicle plant 304 may represent the dynamics of the vehicle in response to the operational signals 310 at the inputs. The vehicle plant 304 provides vehicle output signals 306 that may be measured by the modules. The vehicle output signals 306 may represent the measured signals or quantities.

The low-level controller 300 may provide commands to the engine 18 and electric machines 14 to meet the driver demand. The commands may include torque and speed requests. The low-level controller 300 may measure or receive inputs such as an accelerator pedal position, a brake pedal position, and a vehicle speed (inputs may be represented by the vehicle output signals 306).

The high-level controller 302 may communicate with the low-level controller via the vehicle network. The high-level controller 302 may provide high-level reference signals 308 to the low-level controller 300. The high-level reference signals 308 may include a target state of charge signal, an engine cycling command signal, and a control enable signal. The high-level controller 302 may receive route preview information from the navigation module 52. The high-level controller 302 may implement a control strategy to generate the high-level reference signals 308 based on the route preview information. A predicted driver power demand profile may be generated from the route preview information.

The EMS may be configured to determine an operating mode for the powertrain. The EMS may optimize the operating mode for best fuel economy. The operating mode may define the operating power levels of the engine 18 and the traction battery 24. The operating power levels may then determine the torque and power levels of the electric machines 14. The EMS may determine the operating mode based on various limits. For example, life of the traction battery 24 may be improved by operating the traction battery 24 within a predetermined state of charge range. In situations in which the state of charge is near one of the limits, the operating mode may be selected to maintain the state of charge within the predetermined state of charge range. The tradeoff with this selection of operating mode is that fuel economy may be affected.

The low-level controller 300 may be configured to implement a base or default control strategy to select the operating mode of the powertrain. The default control strategy may be based on a present driver demand. The present driver demand may be a function of present operating inputs such as the accelerator pedal position and the brake pedal position.

The EMS may determine the operating mode based on various parameters. The parameters may include the state of charge and charge/discharge power limits of the traction battery 24. Other parameters may include a brake torque request. The brake torque request may indicate an amount of regenerative energy that is requested by the braking system. Another parameter may be the driver torque demand as determined from an accelerator pedal. Additional parameters may be an available electric machine torque or power and an available engine power. Inputs indicative of a vehicle operating mode may be utilized. For example, an operator may select between a performance mode and an economy mode. In some configurations, the operator may select an electric-only mode of operation. The selected mode may affect the powertrain operating mode selection.

The low-level controller 300 may determine a powertrain operating mode command that includes an engine cycling command. The engine cycling command may be such a request for the engine to be on (e.g., engine 18 running) or off (e.g., engine 18 stopped). The engine cycling command may be a desired on/off state of the engine. The engine cycling command may be referred to as an Engine Pull Up and Down (EPUD) parameter. Related parameters of the engine cycling command may include an engine power request, an engine speed request and an engine torque request. The engine cycling command may define a desired on/off state for the engine and may include additional information. For example, the on/off state may include a forced and an inhibit modifier that affects the response.

The powertrain operating mode command may include an electric machine operating state. The electric machine operating state may include parameters including an electric machine power request, an electric machine torque request, and an electric machine speed request.

The engine cycling command may be a Forced Pull Down (FPD) request in which the engine is commanded to be off. The FPD request may cause the engine to stop and prevent it from restarting regardless of other engine cycling commands. The FPD request may act as an override command to prevent the engine from being started. The FPD request may be reserved for failure conditions or post-ignition-off conditions. The engine cycling command may be a Forced Pull Up (FPU) request in which the engine is commanded to be running. The FPU request may start the engine and maintain the engine in a running condition regardless of other requests. An FPD request may override the FPU request.

The engine cycling command may be an Inhibited Pull Up (IPU) request in which engine starts are inhibited. The IPU request may maintain the engine in a stopped state and may have no effect when the engine is in a running state. The engine cycling command may be an Inhibited Pull Down (IPD) request in which engine stops are inhibited. The IPD request may maintain the engine in a running state and may have no effect when the engine is in a stopped state. The IPD request may be used to extend the running time of the engine.

The engine cycling command may be a Pull Up (PU) request in which the engine is commanded to run or be in an on state. The PU request may start the engine and maintain the engine in the running state. The engine cycling command may be a Pull Down (PD) request in which the engine is commanded to stop. The PD request may stop the engine.

The low-level controller 300 may receive multiple engine cycling commands from various modules or functions. Various functions implemented within the low-level controller 300 or other controllers (e.g., the high-level controller 302) may demand different operating states of the engine. The low-level controller 300 may prioritize the engine cycling requests to determine a final engine cycling command. The priority of the engine cycling commands may be in the following order (from highest priority to lowest): FPD, FPU, IPU, IPD, PU, PD. Other prioritizations are possible and may depend on the particular powertrain system.

The high level controller 302 may determine a high-level engine cycling command that is based on route information. The high-level engine cycling command may include a PU request and a PD request. The high-level engine cycling commands may be inhibited or overridden by selected engine cycling commands of the low-level controller 300.

The high-level controller 302 may communicate the high-level engine cycling command to the low-level controller 300 over the vehicle network. The priority of the high-level engine cycling command is relatively low as the command is limited to PU and PD. The arbitration may use the low-level engine cycling command as a primary source to respond to vehicle modes, hardware protection, and battery maintenance. To use the high-level engine cycling command, the low-level engine cycling command must be permissive of the request by the high-level controller 302.

A forced or inhibit request generated by the low-level controller 300 may take priority over the high-level engine cycling command. So long as there is no forced or inhibit request, the high-level engine cycling command may have priority provided there is no PU request from the low-level controller 300. Such a PU request from the low-level controller 300 may be triggered in response to realistic driving demand that differs from the predicted driving demand or other maintenance reasons (e.g., SOC below minimum threshold).

As an example, consider a PD request by the high-level controller 302. The PD request indicates a desire by the high-level controller 302 that the engine be turned off or stopped. This may be the lowest priority command in the arbitration scheme. In order for the low-level controller 300 to select the PD request, the other engine cycling requests received by the low-level controller 300 must be permissive of the engine off request. The low-level engine cycling request may be permissive of the engine off request when the low-level engine cycling request is not requesting that the engine be on. The low-level engine cycling request may be permissive of the engine off request when the low-level engine cycling request is not inhibiting the engine off (e.g., IPD) or forcing the engine on (e.g., FPU). In general, the high-level engine cycling request may be selected when the low-level engine cycling command does not request an engine state having greater priority.

Additional capabilities for improving fuel economy may be present when the vehicle 12 that includes the navigation module 52. When the navigation module 52 generates a route for the operator, this route information may be utilized to improve fuel economy. Information such as road grade and speed limits along the route may be known. Information such as traffic density, intersections, and stop signs along the route may be known. A route may be divided into segments. The segments may be selected according to consistent route information within the segment. For example, a segment may consist of that portion of the route that is on a highway. The segment may include entry and exit to the highway. The segments may be predetermined time intervals.

There are various techniques available to divide the route into segments. As an example, a segment may include operation at a predicted speed. The segment may include predicted braking events at which the speed is predicted to change. The predicted braking events may be opportunities to recover regenerative energy from the braking system. An amount of regenerative energy to be recovered may allow the vehicle to utilize more energy from the traction battery as that amount of regenerative energy may be recovered during the segment.

The EMS may look ahead to future predicted segments to determine amounts of regenerative energy that may be recovered. In addition, the predicted segments may be analyzed for a predicted amount of energy that must be provided to accelerate the vehicle to a particular speed and a predicted amount of energy to maintain the vehicle at a particular speed. The net amount of energy required may be predicted for each of the segments.

Knowing the amount of energy demand for each of the segments may allow the EMS to plan an optimal operating strategy for reducing fuel consumption. This ability to look ahead at the route allows opportunities to operate the powertrain differently than without the route information. Predicting the net amount of energy demand for the route allows electrical energy to be generated under more optimal conditions. Electrical energy may be generated when the engine is operating in an optimal fuel economy range. For example, the controller may estimate if the state of charge of the battery will remain within a desired operating range. In a segment in which the state of charge is projected to be greater than a maximum SOC limit, more battery energy may be utilized to ensure that the maximum SOC limit is not exceeded.

An Energy Management Planning (EMP) function may be implemented that incorporates the route information into the operating mode selection. The route information may be referred to as preview information. The EMP function may be implemented as instructions in the high-level controller 302. The EMP function may output an engine cycling command, a desired target state of charge, and a planning enable flag. The EMP function may analyze the route information and determine a sequence of target state of charge values and engine cycling command. These parameters may be provided to low-level controller 302 as reference or target values.

The EMP function may input the preview information. The preview information may include predicted profiles of vehicle speed and road grade for the predicted or intended route. In some cases, the preview information may not yield any improvement in fuel economy beyond what is achieved using the base strategy. In some situations, the operator may not have set a destination so route information may not be available. In these cases, the planning enable flag may be set to false. A loss of communications within the system may cause the planning enable flag to be set to false.

The EMP function may determine that there are no fuel saving opportunities based on the route information. Routes in which there are limited engine cycling opportunities may not yield fuel economy improvements over the base strategy of the low-level controller 300. For example, a route that includes significant highway driving with smooth traffic flow may not yield any additional engine on/off opportunities. Other situations may include routes over which the vehicle speed is greater than a predetermined threshold (e.g., 60 mph) for extended periods. Other situations may include routes with consistent uphill driving (e.g., 2% grade). Another example may be uphill driving followed by flat roads at a relatively high constant vehicle speed. Another example may be when a predicted driver power demand profile is greater than a predetermined power over the route. In such situations, the engine 18 may be on the entire time so there are few opportunities for engine cycling. Any engine cycling opportunities may be unplanned and unpredicted by the route information. In such cases, the base strategy may be used to manage the engine cycling strategy.

The high-level controller 302 may analyze the engine cycling commands for the route to determine a number of engine cycling events that are expected over a route segment. If the number of engine cycling events (e.g., on/off transitions of the engine) defined or identified is less than a predetermined number, then the high-level strategy may not yield any fuel economy improvements. In response to the number of engine cycling events being less than the predetermined number, the high-level controller 302 may set the planning enable flag as false to indicate that the low-level controller 300 should use the base operating parameters.

In some situations, the number of engine cycling events may be inferred from the vehicle speed profile and/or the road grade profile. For example, the vehicle speed profile over a route segment may always be greater than a predetermined speed at which the engine is always requested to be running. In this situation, there may not be any additional engine cycling opportunities. In this situation, the planning enable flag may set to false for the route segment.

The low-level controller 300 may receive the planning enable flag. When the planning enable flag is false, the low-level controller 300 may operate the powertrain according to the base strategy. When the planning enable flag is true, the low-level controller 300 may operate the powertrain according to the high-level controller 302 commands based an arbitration strategy. That is, the high-level controller 302 commands are followed provided that there are no higher priority requests from other functions. When there is a loss of communication between the low-level controller 300 and the high-level controller 302, the low-level controller 300 may operate as if the planning enable flag is set to false.

The high-level controller 302 may also generate a high-level battery SOC setpoint to be tracked by the traction battery 24. The low-level controller 300 may receive the high-level battery SOC setpoint and use it as a target SOC value. The low-level controller 300 may follow the high-level battery SOC setpoint when the planning enable flag is true. When the planning enable flag is false, the low-level controller 300 may operate the traction battery 24 using the base or default strategy.

The low-level controller 300 may implement an arbitration strategy for the engine cycling commands. The engine cycling commands may be internally generated and may be received from the high-level controller 302. The low-level controller 300 may prioritize the request to determine a final engine cycling commands for the engine controller. The low-level controller 300 may implement a control strategy for battery SOC tracking. The low-level controller 300 may determine engine and battery power references to drive the battery SOC to the target SOC value.

A benefit of this distributed arrangement is that the high-level controller 302 may be optional based on the inclusion of the navigation module 52 in the vehicle 12. In a vehicle 12 without the navigation module 52, the low-level controller 300 may be programmed with the same program. The powertrain may be controlled using the base strategy as no high-level requests would be received. Another benefit may be that the high-level controller 302 does not have to be concerned with operating limits of the battery 24 and other components. The low-level controller 300 may be responsible for protecting the battery 24 and other components. The high-level controller 302 may focus on the most fuel efficient mode of operation while the low-level controller 300 arbitrates the commands from the high-level controller 302 to ensure proper operation of the powertrain.

Figure 5:
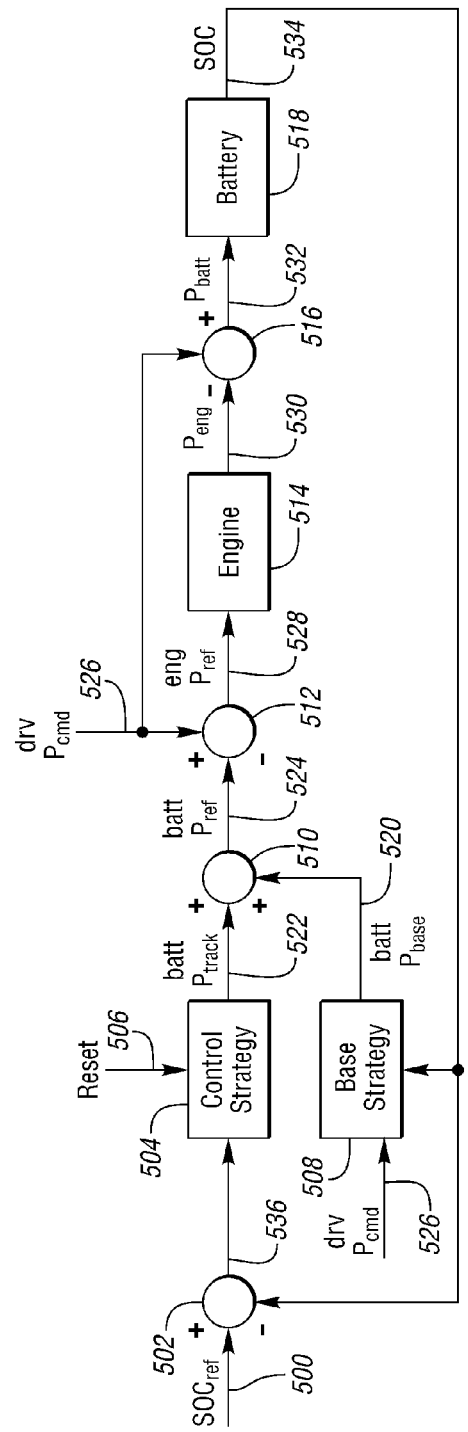
FIG. 5 is a block diagram of a possible battery state of charge tracking control.

FIG. 5 depicts a possible battery SOC tracking control block diagram that represents the interaction between the various signals and power flows. The SOC tracking function may compute an error 536 between a target SOC 500 ($SOC_{Ref}$) received from the high-level controller 302 and the actual SOC 534 of the battery 518. The error 536 may be output from a difference element 502 that represents the subtraction of the actual SOC 534 from the target SOC 500. The error 536 may be input into a control strategy block 504. The control strategy block 504 may implement a control strategy such as a proportional-integral (PI) controller. The control strategy block 504 tracking output 522 may be a battery power ($P^{batt}_{track}$). When the planning enable flag is set to false, the control strategy block tracking output 522 may be set to zero. When the planning enable flag is false, the target SOC 500 may not be valid.

A base control strategy 508 may be implemented that generates a base battery power ($P^{batt}_{base}$) signal 520. The base battery power 520 may be generated using a lookup table. The base control strategy 508 may input the actual SOC 534 and the present driver power demand 526 to generate the base battery power signal 520. The base control strategy 508 may provide an expected battery power level to optimize fuel consumption for the actual SOC 534 and the present driver power demand 526. The base control strategy 508 may also consider battery maintenance SOC limits.

The base battery power 520 and the control strategy block tracking output 522 may be routed to a summing element 510. The base battery power 520 may provide a feedforward battery power value based on a calibration using prior knowledge. The control strategy block tracking output 522 operates as a closed-loop system to generate an appropriate battery power command to drive the actual SOC 534 to the target SOC 500. The summing element 510 may provide a battery power reference power output 524 ($P^{batt}_{ref}$). The battery reference power 524 ($P^{batt}_{ref}$) may indicate a target amount of power to be supplied by or provided to the battery 518.

Difference element 512 may input a driver power demand 526 and the battery reference power 524 and output an engine power reference 528 ($P^{eng}_{ref}$) as the difference between the driver power demand 526 and the battery reference power 524. The engine power reference 528 may indicate an amount of power that should be supplied by the engine 514 to meet the driver and battery demands. The engine power reference 528 may be communicated to the engine controller which may operate the engine 514 to cause an engine power output 530 ($P^{eng}$) as requested by the engine power reference 528. The engine controller may measure or estimate an engine power achieved and communicate the engine power achieved to other controllers.

Difference element 516 may input the driver power demand 526 and the engine power 530 and output a battery power 532 as the difference between the driver power demand 526 and the engine power 530 actually provided. The output of the difference element 516 may represent power that the battery must supply or power that will be supplied to the battery. The battery power 532 ($P^{batt}$) may be the amount of power supplied to or provided by the battery 518 depending upon the sign of the battery power 532.

The control strategy block 504, when implementing a control strategy with an integral portion, may be configured with an integral reset. The integral reset may be triggered by a reset signal 506 to the control strategy block 504. The integral reset causes the integral portion of the tracking control strategy to be reset to a default value (e.g., zero). The integral reset may be applied under certain conditions. One condition may be when a new target SOC value is provided by the high-level controller 302. The integral reset may be initiated after receiving an updated target SOC value. The integral reset allows the accumulated integral value to be reset which improves the response of the PI controller and may allow for quicker response of the state of charge. Additional conditions on the integral reset are possible. For example, the integral reset may be inhibited if the change in the target SOC value is less than a particular threshold.

The high-level controller 302 may implement control strategies to maximize fuel economy by scheduling target SOC values along the route. The high-level controller 302 may identify a sequence of target SOC values based on the route segments. The target SOC values may be coordinated with the high-level engine cycling command. The high-level target SOC value may be a desired battery SOC that is to be achieved at the end of a route segment.

The low level controller 300 may receive the target SOC values. The target SOC values may be separated in time or distance. The high-level controller 302 may communicate the distance or expected time between target SOC values. For example, the high-level controller 302 may send the target SOC values at the end of each route segment. The low-level controller 300 may generate a target SOC reference signal. The target SOC reference signal may be a linear ramp between consecutive target SOC reference signals.

The low-level controller 300 may implement control strategies to track the target SOC values and determine torque commands for the engine 18 and electric machines 14 to achieve the target SOC values. The target SOC values may be received from the high-level controller 302. In some configurations, the low-level controller 300 may select the high-level target SOC value when the planning enable flag is set to true. The low-level controller 300 may select a battery power level according to the base strategy when the planning enable flag is set to false.

The high-level controller 302 may execute the control strategy at a first predetermined rate. For example, the control strategy may execute every second. The low-level controller 300 may execute control operations at a second predetermined rate. For example, the low-level control strategy may be executed every twenty milliseconds. The second predetermined rate may be selected to be faster than the first predetermined rate. In this example, the high-level controller 302 generates outputs every second. The low-level control strategy executes 50 times faster to control the engine 18 and electric machines 14 to the desired setpoints.

Figure 4:
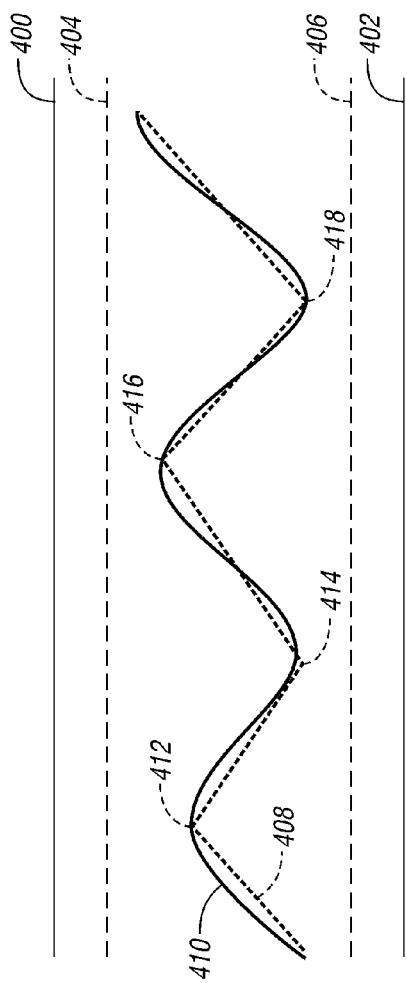
FIG. 4 is a graph depicting a sample output during operation.

FIG. 4 depicts a possible system response during operation of the system disclosed. The high-level controller 302 may establish a high-level SOC high limit 404 and a high-level SOC low limit 406. The high-level controller 302 may also send high-level target SOC values 412, 414, 416, 418 at various times during the route (e.g., at the end of a route segment). For example, a first target SOC value 412 may be expected at the end of a first segment. At the end of the first segment, a second target SOC value 414 may be sent by the high-level controller 302. The low-level controller 300 may operate the traction battery to achieve the second target SOC value 414 at the end of the second segment. The sequence may be repeated for a third target SOC value 416 and a fourth target SOC value 418. The high-level target SOC values 412, 414, 416, 418 may be limited to values between the high-level SOC high limit 404 and the high-level SOC low limit 406. For example, the high-level SOC high limit 404 may be 60% and the high-level SOC low limit 406 may be 40%. The high-level controller 302 may be configured to maintain the high-level target SOC values 412, 414, 416, 418 between these limits.

The low-level controller 300 may establish an upper SOC limit 400 and a lower SOC limit 402. The upper SOC limit 400 may be greater than the high-level SOC high limit 404. The lower SOC limit 402 may be less than the high-level SOC low limit 406. For example, the upper SOC limit 400 may be 70% and the lower SOC limit 402 may be 30%. The upper SOC limit 400 and the lower SOC limit 402 may be referred to at the battery maintenance SOC limits.

The low-level controller 300 may be configured to compute a battery SOC reference signal 408 from the target SOC values 412, 414, 416, 418 received from the high-level controller 302. The battery SOC reference signal 408 may be configured to provide an SOC target profile between the values received from the high-level controller 302. The battery SOC reference 408 may be a linear profile between consecutive target SOC values (e.g., 412 and 414). A rate of change of the battery SOC reference signal 408 may be determined based on the difference between the latest target SOC values and the time between the latest target SOC values. The actual battery SOC 410 may follow the battery SOC reference 408 by operation of the battery SOC tracking control as described herein. In some configurations, the high-level controller 302 may compute and transmit the battery SOC reference signal 408 as described.

When the planning enable flag is set, the base strategy 508 and the control strategy 504 may be outputting a battery power signal. The control strategy 504 and the base strategy 508 may be configured such that each strategy is dominant in a particular state of charge range. For example, in a predefined range that may be defined between the high-level SOC high limit 404 and the high-level SOC low limit 406, the base strategy 508 may provide a base battery power reference 520 that is relatively stable. The control strategy 504 may then provide an additional battery control strategy tracking output 522 that drives the error signal 536 to zero. Outside of the predetermined range, the base strategy 508 may be dominant. The base strategy 508 may output a base battery power 520 that varies more drastically in order to protect the battery and maintain the state of charge within the limits defined by the upper SOC limit 400 and the lower SOC limit 402. When the planning enable flag is set to false, the control strategy block output 522 may be set to zero and the base strategy 508 may dominate the battery power reference signal 524.

This decoupling of the base operating mode determination and the operating mode determination with the preview information allows for better integration into the vehicle 12. Preview information may not be available on all vehicles. For example, the navigation module may be included as part of an option package. The decoupling strategy allows a common controller to be included in all vehicles with the base operating strategy. Those vehicles with the preview information may include an additional controller for the high-level mode determination. The decoupling also minimizes the amount of modification needed for the base strategy.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a navigation system configured to provide predicted speed and grade profiles;
a traction battery;
an engine; and
a controller programmed to (i) generate engine commands including engine off requests and commands permissive of engine off requests, and, in response to a first engine cycling command based on the profiles being an engine off request and a second engine cycling command derived independent of the profiles being permissive of engine off requests while the engine is on, cause the engine to transition to off and (ii) generate a target state of charge for the traction battery based on the profiles and a base battery power reference independent of the profiles, and, in response to the first engine cycling command defining at least a predetermined number of engine cycles over a route, charge and discharge the traction battery based on the target state of charge and the base battery power reference.

2. The vehicle of claim 1 wherein the engine cycling commands further includes engine on requests and commands inhibiting engine off requests and the second engine cycling command is permissive of the engine off request when the second engine cycling command is not an engine on request and the second engine cycling command is not a command inhibiting engine off requests.

3. The vehicle of claim 1 wherein the engine cycling commands further include engine on requests and commands permissive of engine on requests, and the controller is further programmed to, in response to the first engine cycling command being an engine on request and the second engine cycling command being permissive of engine on requests while the engine is off, cause the engine to transition to on.

4. The vehicle of claim 1 wherein the target state of charge for the traction battery is within a first predetermined state of charge range.

5. The vehicle of claim 4 wherein the base battery power reference is a power level selected to control a state of charge of the traction battery within a second predetermined state of charge range that includes the first predetermined state of charge range.

6. The vehicle of claim 4 wherein the controller is further programmed to, in response to the first engine cycling command defining less than the predetermined number of engine cycles over the route, charge and discharge the traction battery according to the base battery power reference, wherein the base battery power reference is based on a present driver power demand, a state of charge of the traction battery and battery maintenance state of charge limits.

7. The vehicle of claim 1 wherein the controller is further programmed to, in response to the first engine cycling command defining less than a predetermined number of predicted engine cycles over a route, operate the engine according to the second engine cycling command.

8. The vehicle of claim 7 wherein the first engine cycling command defines less than a predetermined number of engine cycles when one or more of (i) a predicted vehicle speed profile is greater than a predetermined speed over a route, and (ii) a predicted driver power demand profile is greater than a predetermined power over the route.

9. A vehicle comprising:
an engine; and
a controller programmed to receive a predicted power demand profile from a navigation system and, in response to generating an engine cycling profile from the predicted power demand profile having a number of engine on/off cycles greater than a predetermined number, cycle the engine according to the engine cycling profile, and otherwise, cycle the engine according to an engine cycling state derived from a present driver power demand.

10. The vehicle of claim 9 wherein the controller is further programmed to command the engine according to the engine cycling state when the engine cycling state inhibits a transition requested by the engine cycling profile.

11. The vehicle of claim 9 wherein the controller is further programmed to command the engine according to the engine cycling state when the engine cycling state requests an engine state having greater priority than the engine cycling profile.

12. The vehicle of claim 9 further comprising a traction battery and wherein the controller is further programmed to, in response to the engine cycling profile having the number of engine on/off cycles greater than the predetermined number, charge or discharge the traction battery according to a target state of charge profile derived from the predicted power demand profile, and otherwise, charge or discharge the traction battery according to a battery power reference derived from the present driver power demand.

13. The vehicle of claim 12 wherein the controller is further programmed to, in response to the engine cycling profile having the number of engine on/off cycles greater than the predetermined number, output an engine power request that is based on a difference between the target state of charge profile and a present state of charge of the traction battery.

14. A method comprising:
- receiving, by a controller, predicted speed and grade profiles from a navigation system;
- receiving, by the controller, engine cycling commands including engine off requests and commands permissive of engine off requests;
- stopping, by the controller, an engine in response to a first engine cycling command that is based on the profiles being an engine off request and a second engine cycling command that is independent of the profiles being permissive of the engine off request while the engine is on; and
- outputting, by the controller, a target state of charge for a traction battery based on the profiles and a battery power reference independent of the profiles, and charging and discharging the traction battery according to the target state of charge in response to the first engine cycling command defining at least a predetermined number of engine cycles over a route.

15. The method of claim 14 wherein the engine cycling commands further include commands non-permissive of engine off requests, and further comprising operating the engine according to the second engine cycling command in response to the second engine cycling command being non-permissive of the engine off request.

16. The method of claim 14 wherein the engine cycling commands further include engine on requests and commands permissive of engine on requests, and further comprising outputting, by the controller, an engine on command in response to the first engine cycling command including an engine on request and the second engine cycling command being permissive of the engine on request while the engine is off, and operating the engine according to the engine on command.

17. The method of claim 14 further comprising operating the engine according to the second engine cycling command in response to the first engine cycling command defining less than a predetermined number of predicted engine cycles over a route.

18. The method of claim 14 further comprising operating the engine according to the second engine cycling command in response to the second engine cycling command having greater priority than the first engine cycling command.

* * * * *